(12) United States Patent
Liu et al.

(10) Patent No.: US 8,881,303 B2
(45) Date of Patent: Nov. 4, 2014

(54) SYSTEM AND METHOD FOR EXECUTING WEB SERVICES

(75) Inventors: Hua Liu, Fairport, NY (US); Ramsés V. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 229 days.

(21) Appl. No.: 13/192,704

(22) Filed: Jul. 28, 2011

(65) Prior Publication Data

US 2013/0031639 A1 Jan. 31, 2013

(51) Int. Cl.
| H04L 29/06 | (2006.01) |
| G06F 3/01 | (2006.01) |
| G06F 9/44 | (2006.01) |
| G06F 17/30 | (2006.01) |
| G06F 21/00 | (2013.01) |
| G06F 9/06 | (2006.01) |

(52) U.S. Cl.
CPC .. *G06F 3/01* (2013.01); *G06F 8/30* (2013.01); *G06F 17/30893* (2013.01); *G06F 21/00* (2013.01); *G06F 9/06* (2013.01)
USPC ............................................ 726/28; 715/704

(58) Field of Classification Search
USPC ........................................................ 726/28
See application file for complete search history.

(56) References Cited

U.S. PATENT DOCUMENTS

| 7,734,515 | B1 | 6/2010 | Frederick et al. |
| 7,797,198 | B1 | 9/2010 | Frederick et al. |
| 7,912,763 | B1 | 3/2011 | Frederick et al. |
| 7,912,764 | B1 | 3/2011 | Frederick et al. |
| 7,912,938 | B2 | 3/2011 | Sayal et al. |
| 7,954,107 | B2 | 5/2011 | Mao et al. |
| 2010/0131869 | A1* | 5/2010 | Adachi et al. ................. 715/760 |
| 2011/0321131 | A1* | 12/2011 | Austel et al. ..................... 726/4 |
| 2012/0198342 | A1* | 8/2012 | Mahmud ....................... 715/733 |

OTHER PUBLICATIONS

Lin, J., Wong, J., Nichols, J., Cypher, A., & Lau, T. A. (Feb. 2009). End-user programming of mashups with vegemite. In Proceedings of the 14th international conference on Intelligent user interfaces (pp. 97-106) ACM.*

Ian Li, Jeffrey Nichols, Tessa Lau, Clemens Drews, Allen Cypher, Here's what I did: sharing and reusing web activity with ActionShot, Proceedings of the 28th international conference on Human factors in computing systems, Apr. 10-15, 2010, Atlanta, Georgia, USA.*

Baresi, Luciano, and Sam Guinea. "Consumer mashups with mashlight." Towards a Service-Based Internet (2010): 112-123.*

* cited by examiner

*Primary Examiner* — Vu Le
*Assistant Examiner* — Tracy Mangialaschi
(74) *Attorney, Agent, or Firm* — Fay Sharpe LLP (57) ABSTRACT

The subject embodiments provide a method such as a web service method. The method is used to execute two or more web services that have respective web user interfaces, and are operationally independent of each other. The method comprises: (i) executing the two or more web services under manual operation of a user; (ii) recording a script based on activities of the user in the execution; (iii) securing the recorded script; and (iv) executing the two or more web services by playing said secured script without individually executing them. The method is user friendly; highly customizable; and safe with respect to document retrieval and submission.

21 Claims, 3 Drawing Sheets

SYSTEM AND METHOD FOR EXECUTING WEB SERVICES

BACKGROUND

The present disclosure relates to systems and methods for executing web services. It finds particular application in conjunction with web services used for the design and production of a document such as a brochure and a poster, and will be described with particular reference thereto. However, it is to be appreciated that the present exemplary embodiments are also amenable to other like applications.

Figure 1:
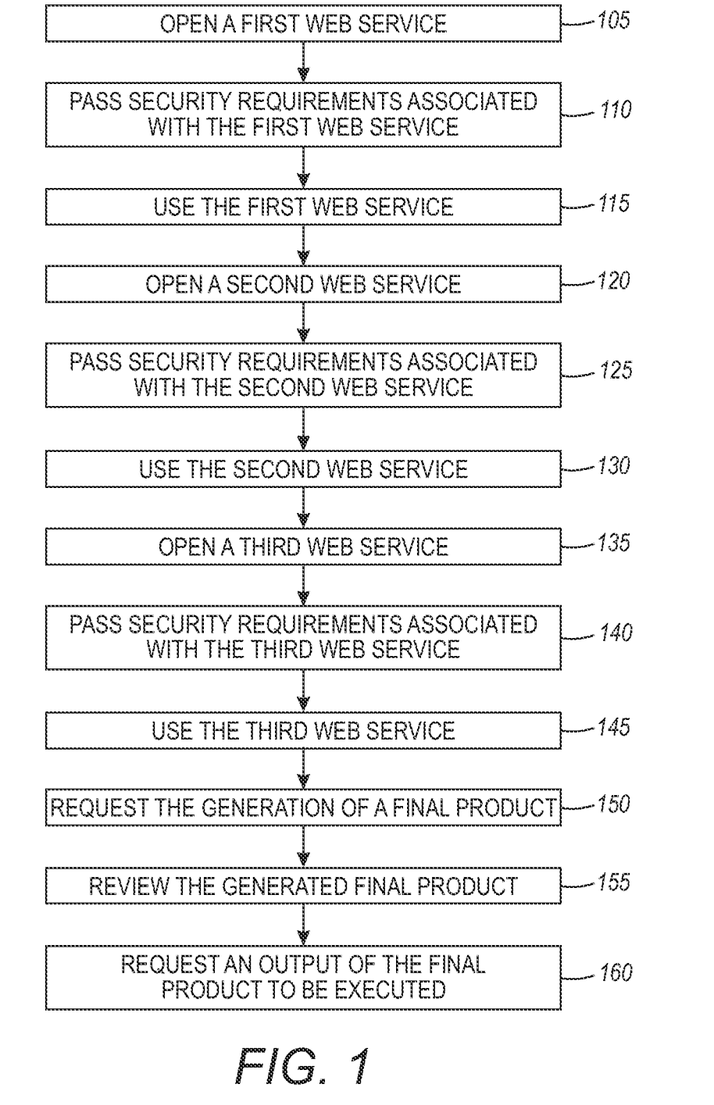
FIG. 1 shows a flow chart outlining a process of executing two or more web services to generate a final product such as a brochure in the prior art.

For a web service user, it can be very labor-intensive and tedious to manually complete multiple projects of similar nature using same web services. For example, a user's daily job may be the design and production of brochures using texts from one web service such as Google Docs, and pictures from another web service such as Flickr®. The user may have to go through a tedious process, as illustrated in FIG. 1, on a daily basis. With reference to FIG. 1, the user might for example open 105 a first web service, such as a brochure design service;

pass 110 security requirements associated with the first web service, such as entering username and password to log on the brochure design service;

use 115 the first web service, such as selecting a brochure template;

open 120 a second web service, such as Flickr®;

pass 125 security requirements associated with the second web service, such as entering username and password to log on Flickr®;

use 130 the second web service, such as finding and selecting a picture from Flickr®;

open 135 a third web service such as Google Docs;

pass 140 security requirements associated with the third web service, such as entering username and password to log on Google Docs;

use 145 the third web service, such as fetching a text file from Google Docs;

request 150 the generation of a final product, for example, the generation of a brochure including the selected picture from Flickr® and the text from Google Docs on the selected brochure template;

review 155 the generated final product, for example, the user may review or proof-read the generated brochure; and request 160 an output of the final product to be executed, for example, printing the brochure on paper. In doing so, the user may need to select an output mode, and enter parameters for the output mode, for example, to select a brochure printing service, and specifies the brochure printing options.

After the brochure on paper is printed on paper, the user may start to work on one or more new brochures. However, the user's tasks are very repetitive, since the difference between one brochure and another may be, for example, only the selection of a different text file and a different picture. Therefore, it is desirable for the web service user to automate such repetitive tasks by organizing them into workflows and automate workflow execution.

Nevertheless, this goal is not easily achievable, because such automation often involves complicated composition and execution of web services. For example, the first approach is to use a programming language and directly compose or program the services. But this approach requires significant programming knowledge and skill. Therefore users without intensive programming experience are not able to adopt this approach. The second approach is Graphical User Interface (GUI) based composition, through which users can drag and drop visual representations of services, and draw lines to connect them. However, this approach cannot process services with user interfaces. For example, some servers may use Business Process Execution Language (BPEL) to compose services based on Web Service Definition Language (WSDL), while other servers may use Enterprise Mashup Markup Language (EMML) to compose services based on their programmable interfaces, e.g. Representational State Transfer (REST), Simple Object Access Protocol (SOAP), and Really Simple Syndication (RSS). As all the drag-and-drop tools require services to have programmable interfaces, the user interfaces are not preserved in composing a service. The third approach allows users to define service composition in a scripting language, for example, Google Apps Script, which is comparable to the first approach, but uses Java script. Nevertheless, this approach still requires that the users have a certain level of programming knowledge and skill. As such, it is also difficult for users without much programming experience to adopt the third approach.

The subject embodiments solve these problems by providing systems and methods for executing two or more web services, at least one of which is secured. As illustrated by the following exemplary embodiments, the method is user friendly; highly customizable; and safe with respect to document retrieval and submission.

BRIEF DESCRIPTION

One aspect of the disclosure provides a method for executing two or more web services that have respective web user interfaces, where the two or more web services are operationally independent of each other, and at least one of the two or more web services is secured with respect to at least one of (a) access to the service, (b) data associated with the service (e.g. parameters, font, and password), and (c) at least one document associated with the service. The method comprises:

(i) executing the two or more web services under manual operation of a user;

(ii) recording a script based on activities of the user in the execution of the two or more web services under the manual operation, wherein the activities include security operation with respect to said at least one of (a) the access to the service, (b) the data associated with the service, and (c) the at least one document associated with the service;

(iii) securing the recorded script; and (iv) executing said two or more web services by playing said secured script without individually executing said two or more web services.

Another aspect of the disclosure provides a program storage medium readable by a computer, tangibly embodying a program of instructions executable by the computer to perform a method for executing two or more web services that have respective web user interfaces, wherein the two or more web services are operationally independent of each other, and at least one of the two or more web services is secured with respect to at least one of (a) access to the service, (b) data associated with the service, and (c) at least one document associated with the service; wherein the method comprises:

(i) recording a script based on activities of a user in an execution of the two or more web services under the manual operation, wherein the activities include security operation with respect to said at least one of (a) the access to the service, (b) the data associated with the service, and (c) the at least one document associated with the service;

(ii) securing the recorded script; and (iii) executing said two or more web services by playing said secured script without individually executing said two or more web services.

DETAILED DESCRIPTION

Figure 2:
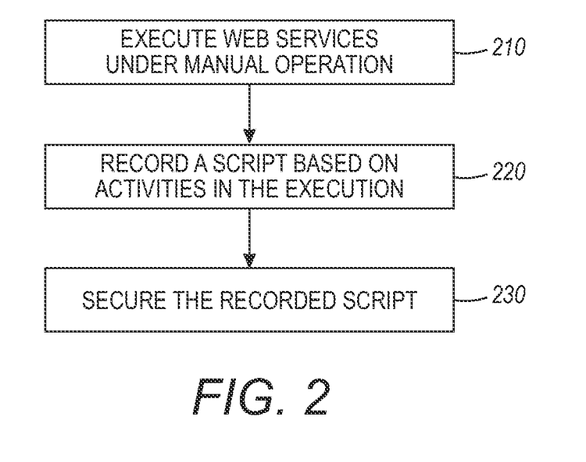
FIG. 2 shows a flow chart outlining a method to generate a secured script intended for automatically executing two or more web services according to an embodiment.

With reference to the flow chart in FIG. 2, the web services in the execution 210 may be two or more web services that are operationally independent of each other. A web service is defined herein as any information source or service, such as a business process, provided over a network (e.g. Internet) based on computer software, and made available for use by an application or an end-user. For example, a web service may be a software system designed to support interoperable machine-to-machine interaction over a network. At least some web services include a combination of programming and data. Generally, a web service is self-contained, modularized, executable entity that can be published, searched for, and accessed across a network. In some embodiments, the web services may be implemented according to widely accepted standards, so that they are portable across disparate computing platforms.

In some embodiments, the web services in the execution 210 may be provided from, or deployed on, a web application server that is implemented in any suitable manner, for example, according to Java 2 Enterprise Edition ("J2EE"), Microsoft .NET, and IBM Websphere. The web service may comply, at least in part, with the basic Web services standards including: the Extensible Markup Language (XML) standard promulgated by the World Wide Web Consortium (W3C) entitled, "Extensible Markup Language (XML) 1.0 (Second Edition)", 6 Oct. 2000 (XML standard) and the Simple Object Access Protocol (SOAP) promulgated by the W3C entitled, "SOAP Version 1.1 Part 1: Messaging Framework and Part 2: Adjuncts", 24 Jun. 2003 (SOAP protocol).

The web services in the execution 210 may be published in any suitable manner, for example, on a service directory via Web Service Definition Language (WSDL) document. A service directory herein may be a registry and discovery service for web services, and may implement one of the Universal, Discovery, Description, and Integration of Web services (UDDI) specifications, for example, UDDI Version 3.0, Published Specification, Dated 19 Jul. 2002 (UDDI specification). The UDDI specification defines a set of SOAP messages that are used to access XML-based data (e.g., a WSDL document) in a directory. The UDDI specification also defines a registry information model to structure the data stored in a service directory and to make it easier to search and navigate. A WSDL document herein may be a document that complies, at least in part, with any of the WSDL standards, for example, the WSDL standard promulgated by W3C entitled, "Web Services Description Language 1.1", 15 Mar. 2001 (WSDL standard). A WSDL document may be an XML document that provides pertinent information about a web service such as its name, the methods that can be called, parameters for the methods, and a location for sending requests.

The web services in the execution 210 may be communicated to a client/user using any suitable transport protocol. Examples of transport protocols that may be used include, but are not limited to, HyperText Transfer Protocol (HTTP), SOAP over HTTP, SOAP over File Transfer Protocol (FTP), SOAP over Simple Mail Transfer Protocol (SMTP), and the like. The HTTP protocol refers to any of the HTTP protocols including, for example, the protocol described in Request For Comments (RFC) 2616 entitled, "HyperText Transport Protocol—HTTP/1.1," June 1999). The File Transfer Protocol refers to any of the FTPs including, for example, the FTP described in RFC 959 entitled, "File Transfer Protocol," October 1985. The Simple Mail Transfer Protocol refers to any of the SMTPs including, for example, the SMTP described in RFC 2821 and entitled, "Simple Mail Transfer Protocol," April 2001.

Examples of web services in the execution 210 include, but are not limited to, web services used for managing (e.g. uploading and replacing) pictures, such as Flickr® provided in http://www.flickr.com/; web services used for handling documents, such as Google Docs as provided in www.docs-.google.com/; dictionary services (e.g. query for synonyms) such as that provided in http://developer.dictionary.com/products; web services used for allocating computation and storage spaces, such as Amazon web services (aws.amazon-.com); and map services (e.g. query for directions and distance), such as Google Map service (http://code.google.com/apis/maps/documentation/webservices/index.html), among others.

As used herein, the term "user" may include a human operator, who interacts with web services from web interfaces by inputting and getting data and documents to/from web services.

At least one, and as many as all, of the web services in the execution 210 of FIG. 2 is secured with respect to at least one of (a) the access to the service(s), (b) the data associated with the service(s), and (c) at least one document associated with the service(s). The term "secured" or "securing" may refer to the application of a security feature such as an authentication feature and/or an authorization feature. The term "authentication feature" refers to a web service functionality that authenticates a user's identity. The term "authorization feature" refers to a web service functionality that determines whether a client/user calling a web service is authorized. Such a security feature can guarantee that access to the web service is legitimate; and data/document exchanged between the web service and a client/user is confidential and/or its integrity is protected. For example, each web service in the execution 210 of FIG. 2 may have its own login/logout operation for security.

In an embodiment, the authentication feature may include the use of a wide range of variables, credentials, and activities, for example, user ID and password, secure ID, terminal ID, network logon, device ID, service URL and digital certification, SAML string, XML string or certificate, IFX/XML service string, RFID, wireless ID, PKI key, digital certificate, IP address and/or subnet, MAC address, biometric (e.g. DNA, voice, fingerprint, retina/iris, weight, and height), Social Security Number, date of birth, place of birth, secret token and cookie specific the device and/or user, and a key fob. The authentication feature may also include challenge questions such as what is your favorite color? What is your favorite pie? What is your dog's name? What was the name of your first pet? What is your brother's name? What was the value of your last transaction? How long have you been a customer?

Based on the activities in the execution 210 of the two or more web services under the manual operation of a user, a script may be recorded in 220 of FIG. 2. For example, as the user interacts with the web services, the user's activity and resulting browser requests to the web services are recorded. As described above, the activities in the execution 210 must include the security operation(s) with respect to the at least one of (a) the access to the service, (b) data associated with the service, and (c) at least one document associated with the service. For example, the user (a brochure designer and producer) goes through (an example of execution 210) the process outlined in FIG. 1, as he/she does every day:

open 105 a first web service, such as a brochure design service;

pass 110 security requirements associated with the first web service, such as entering username and password to log on the brochure design service;

use 115 the first web service, such as selecting a brochure template;

open 120 a second web service, such as Flickr®;

pass 125 security requirements associated with the second web service, such as entering username and password to log on Flickr®;

use 130 the second web service, such as finding and selecting a picture from Flickr®;

open 135 a third web service such as Google Docs;

pass 140 security requirements associated with the third web service, such as entering username and password to log on Google Docs;

use 145 the third web service, such as fetching a text file from Google Docs;

request 150 the generation of a final product, for example, the generation of a brochure including the selected picture from Flickr® and the text from Google Docs on the selected brochure template;

review 155 the generated final product, for example, the user may review or proof-read the generated brochure; and request 160 an output of the final product to be executed, for example, printing the brochure on paper. In doing so, the user may need to select an output mode, and enter parameters for the output mode, for example, to select a brochure printing service, and specifies the brochure printing options.

As can be seen from the above process, the user manually navigates from one web service to another, such as from Flickr to Google Docs; and provides inputs to these services via interfaces. A part or all of these activities or actions may be recorded 220 in a script, which will, via replaying the recorded script, enable the user to automate such repetitive tasks.

In various embodiments, the user can define which activities or actions are automatic, and which remain manual (e.g. requiring human input such as selecting a specific picture). In this example, the user may in the future only want to: (1) use 130 the second web service, such as finding and selecting a picture from Flickr®; (2) use 145 the third web service, such as fetching a text file from Google Docs; and (3) review 155 the generated final product, for example, the user may review or proof-read the generated brochure. Hence, the script recording 220 in FIG. 2 may be paused at these steps (i.e. steps 130, 145, and 155), and as a result, the user's inputs are not captured by the script. When the script is executed in the future (e.g. by an engine), the automation will stop at steps 130, 145, and 155 (which may appear as un-automated pages) waiting for user inputs. At the end, the user may be prompted to complete one or more additional steps(s), for example, name the workflow and save it for future use.

In various embodiments, script recording 220 may be implemented in an "edit mode". The term "edit mode" herein refers to that the user can define which activities or actions in execution 210 are automatic, and which remain manual. In the edit mode, the user manually navigates from one web service to another, and operates on the web pages provided by each of the web services, e.g. provides inputs to these services via interfaces. The invocation sequence of web services and user behaviors on individual web pages (e.g. service inputs) are recorded into a script. Such recording may be executed with e.g. a browser extension. A browser extension is a computer program that extends the functionality of a web browser. For example, a functionality introduced in Microsoft Internet Explorer 5 allows developers to add functionality to the browser and enhance the user interface in a way that is not directly related to the viewable content of Web pages. In an embodiment, the browser extension records such activities into any suitable script such as mashup script, and the browser extension can communicate with a script manager such as a mashup manager (e.g. a secured storage) to store these scripts, and replay them when needed. A mashup script is an XML file that uses the Enterprise Mashup Markup Language (EMML). The mashup manager may also list mashup scripts for users to publish and purchase.

In the edit mode, all the user inputs are by default recorded, unless the user pauses the recording, which can be conveniently and visually designed as pressing a "pause" button. If the "pause" button is pressed in the edit mode, the browser extension does not record user operations on the current web page. The user can then opt out of inputs, if certain steps require being manual. After the user finishes walking through the entire workflow, a script is produced to define the workflow.

After the user finishes the process, he/she can stop the recording, which can also be conveniently and visually designed as pressing a "stop" button. The script such as a mashup script may then be named by the user for future reference and use.

A partial mashup script is displayed as follows. The script describes the sequence of web services for the browser extension to invoke, the input parameters and whether the steps are automated.

```
<service id="designServiceXMPie">
    <step url="http://localhost/init" auto="true"/>
    <step url="http://services.xmpie.com/designService?templateId=15"
        auto="false"/>
</service>
<service id="printServiceXerox">
    <step url="http://localhost/init" auto="true"/>
    <step url="http://services.xerox.com/printService?copy=20&color=
        true&duplex=true" auto="false"/>
</service>
```

In some embodiments, a recorded script may be modified or revised. For example, the user may enter the edit mode on an existing mashup script, click a conveniently and visually designed "fast play" button to advance the script to the point where he/she wants to start the revision. For example, if the user wants to use a different design service, he/she may advance to the step that invokes the old design service, selects a new service (e.g. the user types in the url of the new service), and then operates on the new service. The new design service will be recorded over the old design service, and the user may then exit the edit mode.

With reference to FIG. 2, after the script recording 220 is completed, the recorded script may be secured 230. The term "secured" or "securing" may refer to the application of a security feature such as an authentication feature and/or an authorization feature, as described above and will not be repeated here.

In a sense, the security established in 230 of FIG. 2 replaces, or takes over the function of, all the security or securities that is/are required for the "at least one of the two or more web services". As described above, the "at least one of the two or more web services" was "secured with respect to at least one of (a) the access to the service, (b) the data associated with the service, and (c) at least one document associated with the service". For example, once the security requirements (e.g. username and password) for the recorded script are established, the user may need to use the username and the password for the script only, in order to play the script. The user does not need to pass any of the security requirements (e.g. username and password) for the first web service, the second web service, the third web service . . . and so on.

Similar to the process outlined in FIG. 1, the process outlined in FIG. 2 may generate some documents and data that need to be saved separately from the recorded script, but are functionally linked to the recorded script. For example, data such as the usernames and passwords to log on Flickr® and Google Docs may be recorded in the script, but data and documents such as the picture selected from Flickr® and the text file from Google Docs, as well as the generated brochure, may be separately stored. Similar to a user of personal email account, only the user such as the brochure designer is authorized to store, retrieve, delete, and revise these documents and data. The present disclosure therefore provides a secured location (or account) for a user to store/retrieve these data and document, including but not limited to, those obtained from web services. For simplicity, the secured location (or account) is termed as a Document Bucket, which is functionally and operatively linked to the recorded script.

By way of securing 230 the recorded script, as shown in FIG. 2, all the data and documents stored in the Document Bucket are secured. However, this security measure may not be sufficient to protect the data and documents stored in the Document Bucket from unauthorized accession and misuse by one or more web service providers. For example, when the user uses the recorded script to design a brochure or a poster, the brochure design service provider may gain access to the Document Bucket to retrieve data and documents therein. The brochure design service provider may misuse the gained access to the Document Bucket, and illegally continue to use the data and documents in the Document Bucket. The present disclosure therefore provides additional security measure(s) for the Document Bucket against web service providers such as the brochure design service provider. In an embodiment, such additional security measure(s) may comprise a credential service for limiting the web service providers' access to the Document Bucket. For example, when a web service in the recorded script is invoked, a credential service may generate a credential based on information such as the user's document bucket ID, meta data of the documents that is intended to be processed by the service, the service to use, and the current time. The credential may then be applied to the invoked service. The credential involving the "current time", as used herein, typically has a configurable expiration time, which is after some elapse time from the current time. Each time a service is invoked, a new credential may be generated.

For example, a 10-second time slot may be assigned to nobody but the brochure design web service provider to access assigned documents in the Document Bucket, and to retrieve data and documents stored therein. The assigned documents may be determined by both the location of a document (e.g. a bucket ID) and meta data associated with a document. For example, only files that are JPEG files and are stored in Bucket ID #1267 (which is owned by user John Smith) can be made available to the web service provider. After 10 seconds, the brochure design web service provider is foreclosed from accession to the Document Bucket. Next time, similar credential will be created again to limit the web service provider's accession. The additional security measure can prevent the use of expired credential to access user's data and documents maliciously. For example, such measure can prevent malicious web service providers from caching credentials to access the user's Document Bucket without authorization.

The additional security measure(s), together with that established by securing 230 the recorded script, make the subject method suitable for highly confidential workflows such as enterprise document processing workflows.

Figure 3:
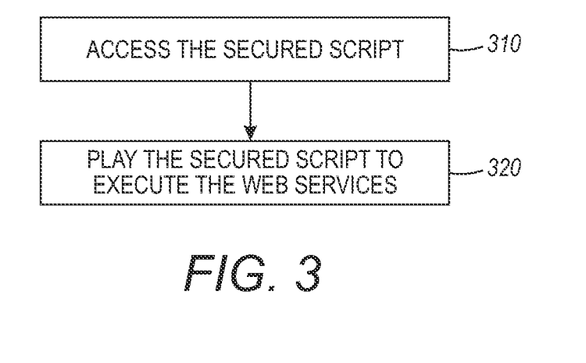
FIG. 3 shows a flow chart outlining a general process of using a secured script for automatically executing two or more web services according to an embodiment.

The flow chart as shown in FIG. 3 illustrates how the secured script may be used. With reference to FIG. 3, after accessing (e.g. enter user name and password) the secured script in 310, the two or more web services web services may be executed in 320 by playing the secured script without manually and individually executing the two or more web services.

Figure 4:
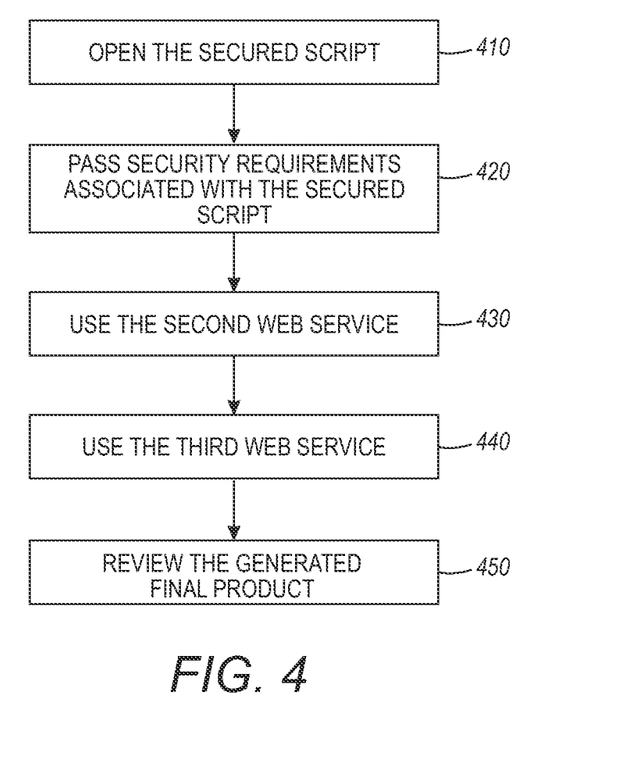
FIG. 4 shows a flow chart outlining an exemplary process of using a secured script for automatically executing two or more web services according to an embodiment.

With the aid of the secured script in FIG. 3, a process of executing two or more web services, such as that outlined in FIG. 1 (12 steps), can be operatively simplified into a process as outlined in FIG. 4 (5 steps). With reference to FIG. 4, the user may open 410 the secured script;

pass 420 security requirements associated with the secured script, such as entering a password;

use 430 the second web service, such as finding and selecting a picture from Flickr®;

use 440 the third web service, such as fetching a text file from Google Docs; and review 450 the generated final product, for example, the user may review or proof-read the generated brochure.

With reference to FIGS. 1 and 4, between 420 and 430, the secured script can be automatically played to execute the activities including 105, 110, 115, 120, and 125 as shown in FIG. 1. Between 430 and 440, the secured script can be automatically played to execute the activities including 135 and 140 as shown in FIG. 1. Between 440 and 450, the secured script can be automatically played to execute 150 as shown in FIG. 1. After 450, the secured script can be automatically played to execute 160 as shown in FIG. 1. After 450, the secured script can be automatically played to select an output mode, and to enter parameters for the output mode, for example, to select a brochure printing service and to specify the brochure printing options.

Based on the recorded script, an aspect of the subject method may provide a new primary web service that automates and consolidates the "two or more web services" as described above, such as the first, second, and third web services as shown in FIG. 1. For example, a specific embodiment of FIG. 4 may be that, the user (e.g. a brochure designer and producer) goes to the interface such as a main page of the new primary web service, with the secured script exhibited as a workflow icon shown thereon. Next, the user activates the scripted workflow, for example, by clicking the workflow icon. Software (e.g. an engine) that reads, interprets, and executes the script may execute the script directly to a point where the user can manually select a picture from Flickr®. After that, the engine continues to execute the script to a point where the user can manually select a text file from Google Docs. Subsequently, the engine may continue to execute the script (e.g. automatically invoke a design service, select a previously used brochure template, and combine or "stitch" the selected picture and text file to make a brochure) until the user is prompted to proof-read the generated brochure, and to manually accept it, for example, by pressing an "accept" button on the page. At last, the accepted brochure will be automatically printed on the printer used in the last time with the same print settings.

As will be explained in detail, the subject method is capable of facilitating backend data flows among web services.

With reference to FIG. 1, when the user uses 130 the second web service, such as finding and selecting a picture from Flickr, the picture is retrieved from Flickr and stored on the user's local disk. Data and documents, such as the picture, flow from Flickr to the user (a first "data flow"). Similarly, when the user uses 145 the third web service, such as fetching a text file from Google Docs, there is a second data flow from Google Docs to the user's disk. When the user requests 150 the generation of a final product, for example, the generation of a brochure including the selected picture from Flickr® and the text from Google Docs on a selected brochure or poster template, the picture and the text are submitted from the user's local disk to a brochure design service. There is a third data flow from the user's local disk to the design service. To summarize, in the process as shown in FIG. 1, the user needs to manually retrieve, exchange, and transfer data and document between web services. These data flows can be called "frontend data flows", since they can be manually controlled by the user, and are therefore "visible" to the user.

According to the subject method, the frontend data flows can be automatically handled and become "invisible" to the user. Such data flows are named as "backend data flows", in contrast to the "frontend data flows". The term "backend" refers to a scenario wherein, for example, when the user selects a picture from Flickr, he/she doesn't need to store the picture in his/her local disk. The picture is automatically stored in the document bucket (backend data flow). Next, the user may directly select a document from Google Docs, which is also automatically stored in the document bucket (backend data flow). After the user selects the brochure or poster template, the picture and the document are automatically retrieved from the document bucket and submitted to the design service (backend data flow). All these backend data flows take place without the user's intervention, and are thus "invisible" to the user.

With reference to FIG. 3, after accessing 310 (e.g. enter user name and password) the secured script, the two or more web services may be executed in 320 by playing the secured script without manually and individually executing the two or more web services.

It is also contemplated that, in performing 320 of FIG. 3, the user may still have the option of creating a new script when he plays the original script. When a user is operating on a manual page of a scripted work flow, the user may operate in a manner not expected by the original script, and thus create a new scripted work flow. For example, a scripted workflow A-B-C is currently at service B (which is a manual service), and the following service in the workflow is service C. The user may click a link that takes the user from service B to service D instead of service C. A new work flow, A-B-D, may optionally be scripted by the user. The user may come back to service C after using service D, but the parameters of the HTTP call for executing C in the new script may be different from that in the original script.

With reference to FIG. 4, the user may open 410 the secured script (original script); pass 420 security requirements associated with the secured script, such as entering a password; and use 430 the second web service, such as finding and selecting a picture from Flickr®. When the user is scripted to use 440 the third web service, such as fetching a text file from Google Docs, the user changes his mind, and decides to open his Gmail account and fetches a text file therefrom. If desired, the user may create a new script for the new work flow. Otherwise, the user may just use the new work flow for one time, and choose not to record it as a new script. The part in the new script (if recorded) that is prior to using 440 the third web service will be the same as that in the original script that is prior to using 440 the third web service. But the part in the new script that is after using 440 the third web service will be different from the original script. In this example, the two workflows may be said to diverge at the point of using 440 the third web service.

A program storage medium readable by a computer in the present disclosure can be an electronic, magnetic, optical, electromagnetic, or semiconductor system (or apparatus or device). Examples of such medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

Any suitable web node (server or client) may be used to accomplish the method for executing two or more web services as provided by the present disclosure. Examples of web node include, but are not limited to, a desktop computer, workstation, laptop, cell phone, personal digital assistant or any other similar devices. The node may include processor(s), one or more Input/Output (I/O) devices, memory, and network interface(s) that are connected together and communicatable through a system interconnection.

The processor(s) may include a microprocessor, microcontroller, field programmable gate array (FPGA), application specific integrated circuit (ASIC), central processing unit (CPU), graphic processing unit (GPU), programmable logic device (PLD), and similar devices that access instructions from system storage (e.g., a memory), decode them, and execute those instructions by performing arithmetic and logical operations. A CPU may include co-processing architectures that perform parallel processing, or alternatively, dedicated to perform specific tasks.

One or more I/O devices may include a hard disk drive interface, a magnetic disk drive interface, an optical drive interface, a parallel port, serial controller or super I/O controller, serial port, universal serial bus (USB) port, a display device interface (e.g., video adapter), a LCD display, an LED display, a plasma display, a projection display, a touch screen display, a network interface card (NIC), a sound card, modem, keyboard, mouse, printer, one or more buttons, one or more switches, one or more toggles, network connections, and the like.

The memory in the node may include a wide variety of memory devices such as read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. The memory may also include non-transient computer readable medium; one or more hard disks, floppy disks, ZIP disks, compact disks (e.g., CD-ROM), digital versatile/video disks (DVD), magnetic disks or other magnetic storage medium; magnetic random access memory (MRAM) devices, and other system-readable media that store instructions and/or data. The memory may store program modules such as routines, programs, objects, images, data structures, program data, and other program modules that perform particular tasks or implement particular abstract data types.

The system interconnection may include a wide variety of signal lines including one or more of a memory bus, peripheral bus, local bus, host bus, bridge, optical, electrical, acoustical, and other propagated signal lines.

The present disclosure exhibits numerous technical merits and advantages. For example, although methods and systems for web service composition are known, they mainly focus on providing standard programmatic interfaces for creating specific workflows. In contrast, the subject method is easy to use, and can enable the automatic creation of a workflow by a user with no programming skills. Second, browser extension/plug-in approaches (e.g. Coscripter on http://coscripter.researchlabs.ibm.com/coscripter and Selenium on http://seleniumhg.org/) record actions that users have taken on a page, and allow the actions to be replayed. However, these approaches are lack of support for facilitating backend data flows among services, and they don't support service composition either. Third, the present disclosure provides a secured document retrieval and submission for services to protect user data, which are very suitable for enterprise document processing workflows.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for executing two or more web services that have respective web user interfaces, wherein the two or more web services are operationally independent of each other, and at least one of the two or more web services requires an independent security operation be performed for at least one of (a) access (b) data retrieval, and (c) document retrieval, wherein the method comprises:
   (i) executing the two or more web services in response to user inputs;
   (ii) recording a script based on activities of the user in the execution of the two or more web services, including recording security data on the script needed to access each one web page and, in response to the security operation being performed for the one of the data retrieval and document retrieval, storing the one of the secured data and document in a separate location associated with the script;
   (iii) condensing the two or more web services by securing the recorded script, the securing including establishing a security requirement for using the script different from the security operation previously performed to access the each one web page; and
   (iv) in response to performance of the security requirement, executing a workflow by playing the secured script, using the script for bypassing the independent security operation for each web service and automatically invoking a sequence of the two or more web services by a browser.

2. The method according to claim 1, wherein each of the two or more web services is secured with respect to at least one of (a) accessing the service, (b) retrieving data associated with the service, and (c) retrieving at least one document associated with the service.

3. The method according to claim 1, wherein the two or more web services are communicated to the user using HyperText Transfer Protocol (HTTP).

4. The method according to claim 1, wherein the two or more web services comprise a picture management web service, a text file management web service, a brochure design web service, a dictionary web service; a map web service, and a web service for allocating computation and storage spaces.

5. The method according to claim 1, wherein the two or more web services comprise at least three web services.

6. The method according to claim 5, wherein the three web services are selected from a brochure design web service, a picture management web service, and a text file management web service.

7. The method according to claim 1, wherein, when recording the script based on activities of the user in the execution of the two or more web services under the manual operation, the user can define which activities become automatic when replaying the script, and which activities remain manual when replaying the script.

8. The method according to claim 1, wherein the script is mashup script.

9. The method according to claim 1, wherein the securing the recorded script comprises the use of a username and a password.

10. The method according to claim 1, further comprising storing data and documents generated from using the two or more web services in a location (Document Bucket) other than the user's local disk.

11. The method according to claim 10, wherein the location is in a web server.

12. The method according to claim 10, further comprising securing the data and documents stored in the location with a security measure.

13. The method according to claim 12, wherein the security measure comprises a credential that limits the accession to the data and documents stored in the location from any of the two or more web services providers.

14. The method according to claim 13, wherein the credential has a configurable expiration time.

15. The method according to claim 1, further providing a primary web service that can consolidate the two or more web services, and can at least partially automate the two or more web services.

16. The method according to claim 15, further comprising storing data and documents generated from using the two or more web services in a location (Document Bucket) other than the user's local disk.

17. The method according to claim 16, wherein the location is in the web server providing the primary web service.

18. The method according to claim 16, wherein the data and documents stored in the location can be directly communicated to at least one of the two or more web services without the user's intervention (Backend Data Flow).

19. The method according to claim 15, further comprising securing the data and documents stored in the location with a security measure.

20. The method according to claim 19, wherein the security measure comprises a credential that limits the accession to the data and documents stored in the location from any of the two or more web services provider.

21. A non-transitory computer readable medium comprising instructions that when executed by a processor in a computer cause the processor to execute two or more web services, wherein the two or more web services are operationally independent of each other, and at least one of the two or more web services requires an independent security operation be performed with respect to at least one of (a) access, (b) data retrieval, and (c) document retrieval associated with the service; wherein the method comprises:

- executing the two or more web services in response to user inputs;
- recording a security operation on a script needed to access each one web page and, in response to the security operation being performed with respect to the one of the data and document retrieval, storing the one of the secured data and document in a separate location associated with the script;
- securing the script by establishing a security requirement for using the script different from the security operation needed to access the at least one web page;
- in response to performance of the security requirement, using the script to access the web pages while bypassing the security operation for the each one web page.

* * * * *